United States Patent [19]

Cook

[11] Patent Number: 4,834,517
[45] Date of Patent: May 30, 1989

[54] METHOD AND APPARATUS FOR RECEIVING OPTICAL SIGNALS

[75] Inventor: Lacy G. Cook, El Segundo, Calif.

[73] Assignee: Hughes Aircraft Company, Los Angeles, Calif.

[21] Appl. No.: 2,907

[22] Filed: Jan. 13, 1987

[51] Int. Cl.$^4$ .................... G02B 17/06; G02B 23/06
[52] U.S. Cl. .................................................. 350/505
[58] Field of Search .............. 350/505, 504, 503, 620, 350/619

[56] References Cited

U.S. PATENT DOCUMENTS

| | | | |
|---|---|---|---|
| 3,674,334 | 7/1972 | Offner | 350/55 |
| 4,101,195 | 7/1978 | Korsch | 350/55 |
| 4,226,501 | 10/1980 | Shafer | 350/505 |
| 4,240,707 | 12/1980 | Wetherell et al. | 350/620 |
| 4,265,510 | 5/1981 | Cook | 350/505 |
| 4,598,981 | 7/1986 | Hullam et al. | 350/505 |
| 4,632,521 | 12/1986 | Korsch | 350/505 |
| 4,733,955 | 3/1988 | Cook | 350/620 |
| 4,737,021 | 4/1988 | Korsch | 350/505 |

OTHER PUBLICATIONS

Dietrich Korsch, "Design and Optimization technique for three-mirror telescopes", *Applied Optics*, vol. 19, No. 21, Nov. 1, 1980, pp. 3640–3645(350/620).
Robert J. Magee, "A New Class of All-Reflective Optical Systems", *SPIE vol. 172 Instrumentation in Astronomy III* (1979) pp. 24–30 from Conference: Proceedings of the Society of Photo-Optical Instrumentation Engineers, Tucson, Az., USA (Jan. 29-Feb. 1 1979).
David R. Shafer, "Four-mirror unobscured anastigmatic telescopes with allspherical surfaces", Applied Optics vol. 17, No. 7, Apr. 1, 1978, pp. 1072–1074.

Primary Examiner—Jon W. Henry
Attorney, Agent, or Firm—William J. Streeter; A. W. Karambelas

[57] ABSTRACT

A method and apparatus for receiving optical signals is disclosed. The apparatus 10 comprises a primary mirror 14 to create an intermediate image 22 between the primary mirror 14 and a secondary mirror 16. The apparatus 10 further comprises a tertiary mirror 18 in optical communication with the secondary mirror 16.

22 Claims, 3 Drawing Sheets

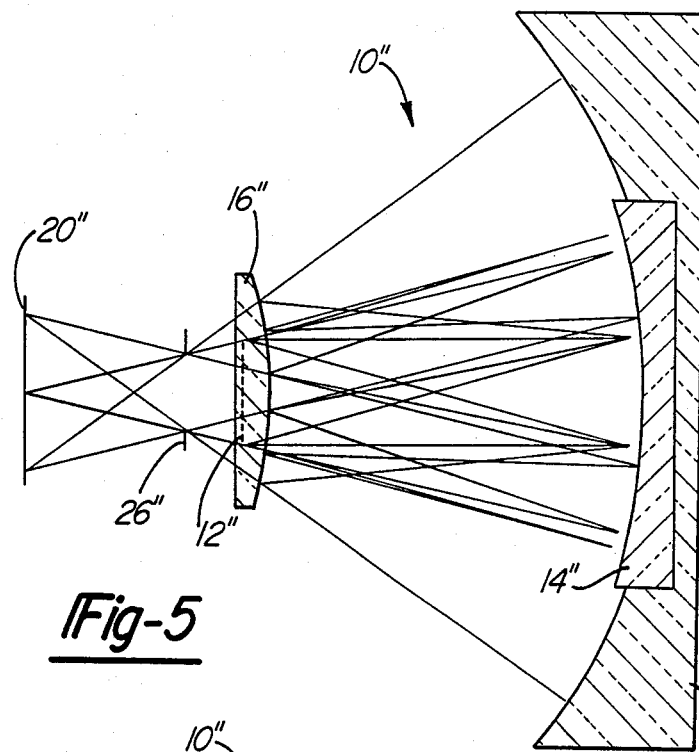
_Fig-5_
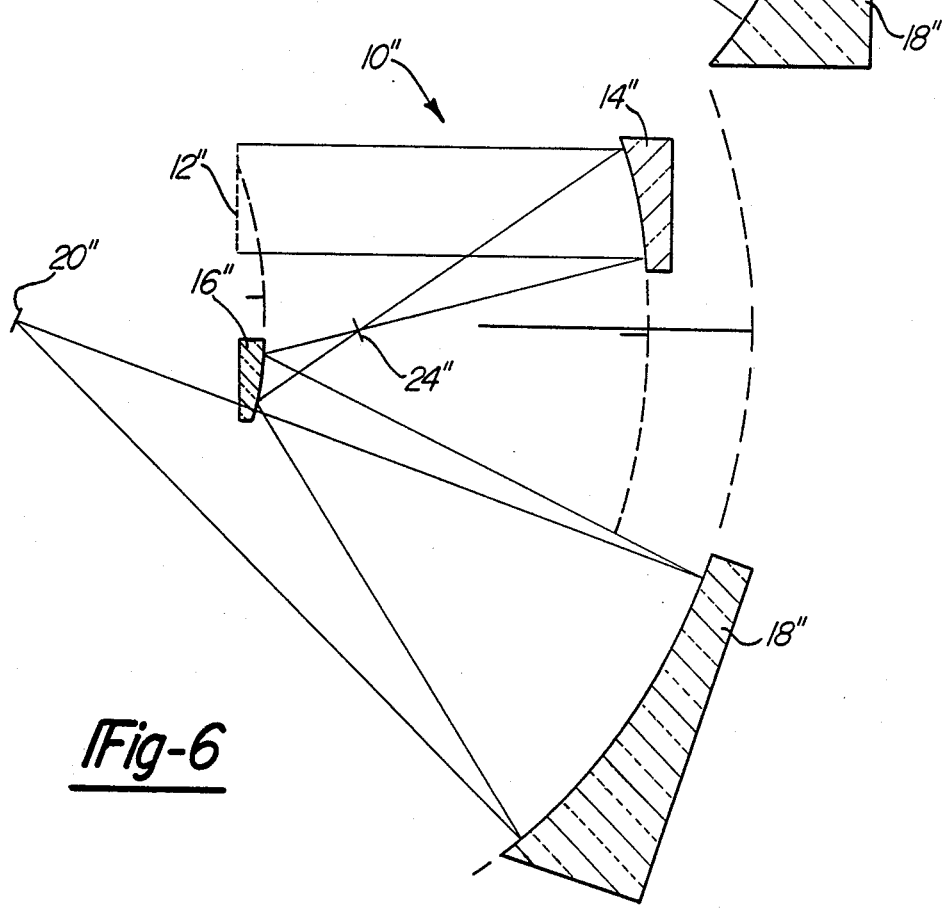
_Fig-6_

METHOD AND APPARATUS FOR RECEIVING OPTICAL SIGNALS

BACKGROUND OF THE INVENTION

1. Field of the Invention

This invention relates to the field of optical systems, and more particularly to the method and apparatus for receiving optical information.

2. Description of Related Art

Infrared detecting systems often use optical systems to focus electromagnetic radiation onto an infrared detector array. For those applications where the spectral range of the radiation to be received is very broad, optical systems composed of mirrors are preferred over those composed of refractive lenses. Such reflective optical systems often comprise primary, secondary and tertiary mirrors in which electromagnetic radiation from a source is received and delivered to the primary mirror. The primary mirror then passes the electromagnetic radiation onto the second mirror, which in turn passes the electromagnetic radiation onto the tertiary mirror. The electromagnetic radiation received by the tertiary mirror is then focused onto the infrared detector array which generates electrical signals in response to the radiation received.

Reflective optical systems employing three mirrors are of particular interest in that such systems generally permit correction for the three fundamental types of geometrical aberrations: spherical aberrations, comas, and astigmatism. Spherical aberration is an aberration caused by the spherical form of the mirror that gives different foci for central and marginal rays. Coma is a manifestation of aberration in which the image of a point source not on the axis of the mirror produces a comet-shaped blur. Astigmatism is a defect in an optical system in which rays from a single point of an object fail to meet in a single focal point thus causing the image of a point to be drawn out into a line. When one of the three mirrors in the system is configured so as to provide negative optical power, aberrations due to the curvature of the field may also be corrected.

In certain applications, optical systems must reject and block undesired stray radiation. Failure to reject and block this stray radiation generally results in high levels of noise and spurious signals which inhibit the detection of the desired radiation. Optical systems which provide the most effective means for rejecting stray radiation are termed re-imaging (or relayed) optical systems. Re-imaging optical systems generally have two characteristics: (1) the presence of a real intermediate scene image located within the optical system where a restricting aperture known as a "field stop" can be placed, and (2) the presence of the real image of the system entrance pupil located within the optical system where a restricting aperture known as an "aperture stop" can be placed. Re-imaging three-mirror optical systems are generally preferred for those applications where a high level of aberration correction and a high level of stray radiation rejection are encountered.

While known re-imaging optical systems are generally effective in delivering electromagnetic radiation to a detector array, they often had several disadvantages associated with their use. Chief among these disadvantages are limitations on the useful field of view which can be imaged. The limitations on the use of field view would often result from one or more of the following situations:

(a) ray interferences, vignetting, lack of appropriate clearances, and excessive mirror sizes (b) excessive geometrical aberrations which prevent the formation of an acceptable image (c) distortion of the image field which alters the relationship between the object and the image of that object (d) high angles of incidence of the image F-cones onto the focal plane which can interfere with proper detector and spectral filter operation (e) excessive collecting area variation resulting from aberrations in the process of re-imaging the entrance pupil to the aperture stop Several of these limitations are directly related to the magnification at which entrance pupil is re-imaged to the size of the aperture stop. The higher this magnification is, the smaller the aperture stop is relative to the entrance pupil, and the larger of the field of view at the aperture stop is relative to the object space field of view of the system.

SUMMARY OF THE INVENTION

According to the preferred embodiment of the present invention, a method and apparatus for receiving optical signals is disclosed. The apparatus comprises a primary mirror operable to create an intermediate image between the primary mirror and a secondary mirror. The apparatus further comprises a tertiary mirror in optical communication with the secondary mirror.

BRIEF DESCRIPTION OF THE DRAWINGS

Various advantages of the present invention will become apparent to one skilled in the art upon reading the following specification with reference to the following drawings in which:

FIG. 5 is a diagrammatic top elevation of the optical system made in accordance with the teachings of a third embodiment of the present invention; and FIG. 6 is a diagrammatic side elevation of the optical system made in accordance with the teachings of the third embodiment of the present invention shown in FIG. 5.

DESCRIPTION OF THE PREFERRED EMBODIMENT

Figure 1:
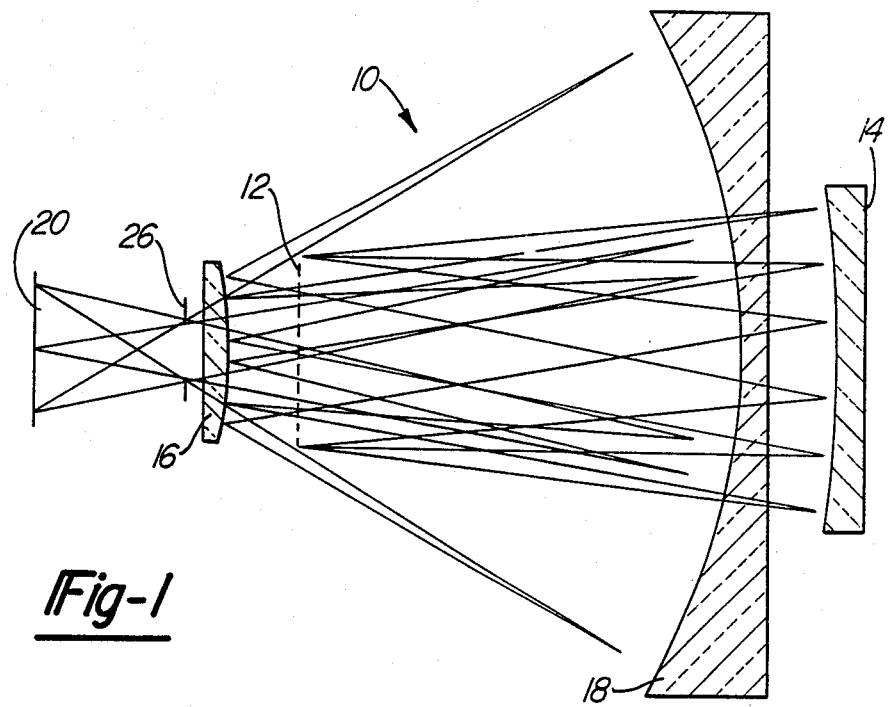
FIG. 1 is a diagrammatic top elevation of the optical system made in accordance with the teachings of a first embodiment of the present invention.

Referring to FIG. 1, an apparatus 10 for receiving optical signals according to the first preferred embodiment of the present invention is shown. The apparatus 10 comprises an entrance pupil 12 which is displaced laterally for the nominal optical axis of the apparatus 10. The entrance pupil 12 is displaced in this manner, and the aperture is unencumbered by any other optical elements, including the secondary mirror described below, and any mechanical structure necessary to hold or contain the optical elements thereby producing a relatively smooth and compact impulse response or point spread function. Optical signals are received through the entrance pupil 12 and are delivered to a primary mirror 14. The primary mirror 14 is a conic section resembling an ellipsoid and is used to deliver the received optical signals to a secondary mirror 16. The secondary mirror 16 has a hyperboloidal shape and is used to deliver the optical signals to a tertiary mirror 18. The tertiary mirror 18 is of an ellipsoidal shape and is used to deliver the optical signals from the secondary mirror 16 to an optical sensor located at the final focal plane 20.

Because the primary mirror 14 is concave, the secondary mirror 16 is convex, and the tertiary mirror 18 is concave, the power distribution of the mirrors 14-18 of the apparatus 10 is positive, negative, and positive respectively. The precise power of each of the mirrors 14-18 is selected in such a manner that the sum of the powers of the mirrors 14-18 are zero so as to provide correction of the Petzval sum and to cause the final focal surface 20 to be planar. To permit the optical system to have a wide useful field of view, the primary mirror 14 is shaped to permit the intermediate image 22 to be formed at a location between the primary mirror 14 and the secondary mirror 16. By permitting the intermediate image 22 to be formed between the primary mirror 14 and secondary mirror 16, the objective portion of the apparatus 10 includes only the primary mirror 14.

To eliminate the influence of electromagnetic radiation received by the primary mirror 14 from a source outside the field of view of the apparatus 10, a field stop 24 is provided. The field stop 24 permits passage of the intermediate image 22 from the primary mirror 14 to the secondary mirror 16 through an aperture, while prohibiting the passage of substantially all of the electromagnetic radiation which is delivered to the primary mirror 14 from a source outside the field of view of the apparatus 10. However, the aperture in the field stop 24 is oversized slightly relative to the optical sensor (not shown) located at the final focal plane 20 so as to prevent radiation diffracted from the field stop 24 from reaching the optical sensor at the final focal plane 20.

The secondary mirror 16 and the tertiary mirror 18 constitute the relay portion of the apparatus 10 which is used to re-image the intermediate image 22 to the final focal plane 20. In re-imaging the intermediate image 22, an image of the entrance pupil 12 is formed at the location between the tertiary mirror 18 and the final focal plane 20. To prohibit passage of radiation diffracted from the entrance pupil 12, an aperture stop 26 is provided. The aperture stop 26 is located between the tertiary mirror 18 and the final focal plane 20 at a position where the image of the entrance pupil 12 is formed. The aperture stop 26 comprises a planar member having an opening of sufficient size to permit passage of substantially all of the radiation which passed through the entrance pupil 12. In addition, the opening in the aperture stop 26 is undersized slightly relative to the image of the entrance pupil 12 so as to prohibit passage of radiation diffracted from the entrance pupil 12.

The magnification at which the entrance pupil 12 is re-imaged at the aperture stop 26 is relatively low (approximately between 0.25X and 0.67X). As a result, wide fields-of-view are possible through the apparatus 10 with correspondingly low incidence angles on the final focal surface 20, low aberrations in the process of re-imaging the entrance pupil 12 at the aperture stop 26, and small collecting areas variations through the entrance pupil 12 which would ordinarily result from pupil imagery aberrations. Further, optical speeds of F/2 and slower are obtainable.

Figure 2:
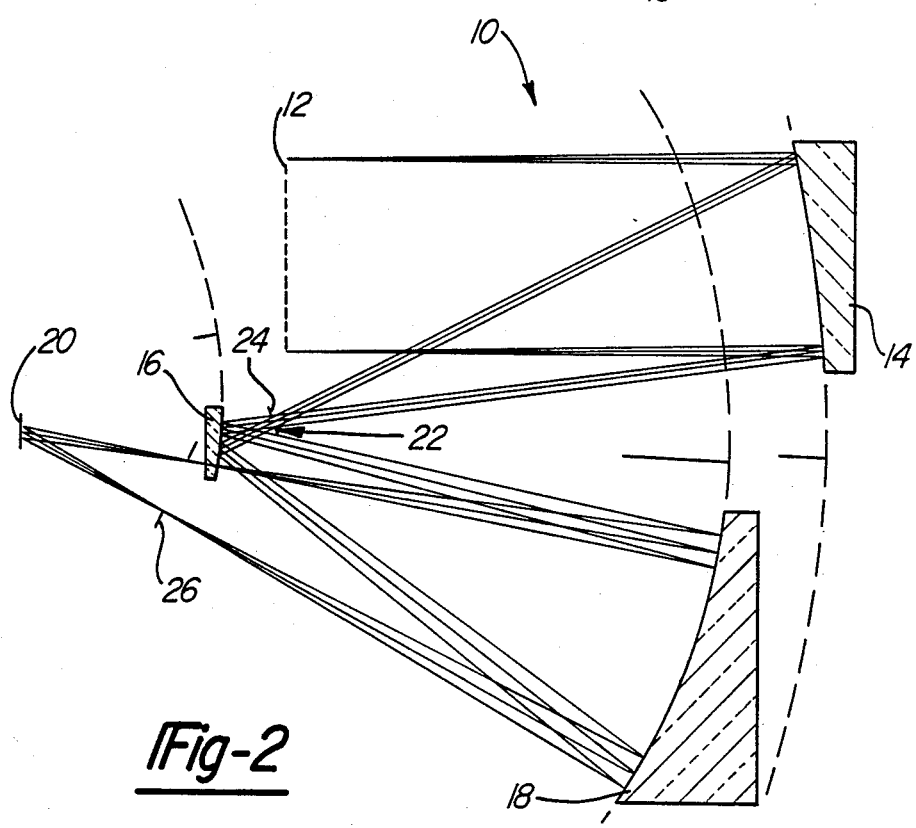
FIG. 2 is a diagrammatic side elevation of the optical system made in accordance with the teachings of the first embodiment of the present invention shown in FIG. 1.

A non-limiting example of the first preferred embodiment of the present invention shown in FIGS. 1-2 has the following prescription:

TABLE 1

| Surface | Radius | CC | Decenter | Tilt | Thickness |
|---|---|---|---|---|---|
| Entrance Pupil 12 | ∞ | — | 0.352 | — | 0.940 |
| Primary Mirror 14 | −1.932 | −0.6726 | 0.035 | −0.475 | −1.171 |
| Secondary Mirror 16 | −0.778 | −1.5633 | 0.215 | 9.222 | 0.901 |
| Tertiary Mirror 18 | −1.088 | −0.0249 | 0.024 | −2.120 | −1.244 |
| Focal Plane 20 | ∞ | — | — | −4.095 | — | where:
(+) Radii have centers to the right
(+) Thickness to the right
(+) Decenters are up
(+) Tilts are counterclockwise and in degrees
Decenters performed before tilts CC = $-\epsilon^2$ = −(Eccentricity)$^2$ The example of the first preferred embodiment of the present invention has a focal length of 1.00 and an entrance pupil diameter of 0.33. In addition, the example has a useful field-of-view of 1°×12° with an offset of 1.4°, and an optical speed of F/3.0. The pupil magnification of this example is 0.31X.

Figure 3:
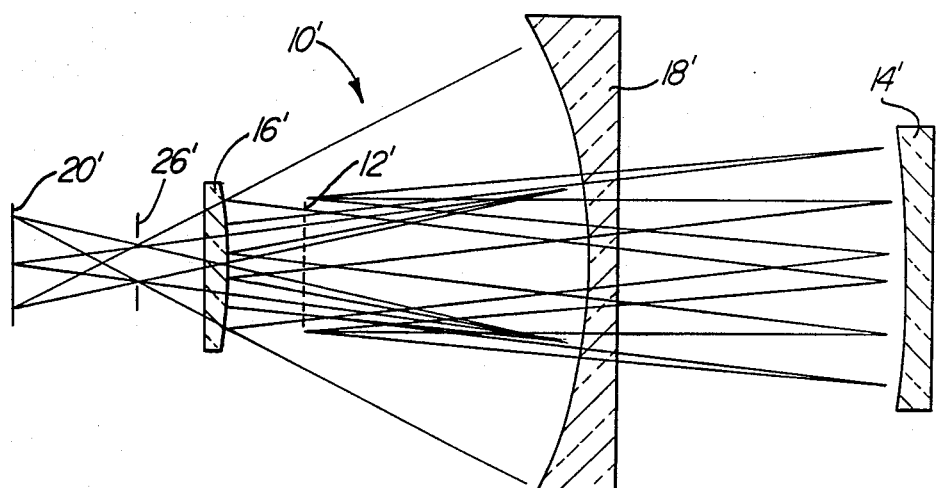
FIG. 3 is a diagrammatic top elevation of the optical system made in accordance with the teachings of a second embodiment of the present invention.
Figure 4:
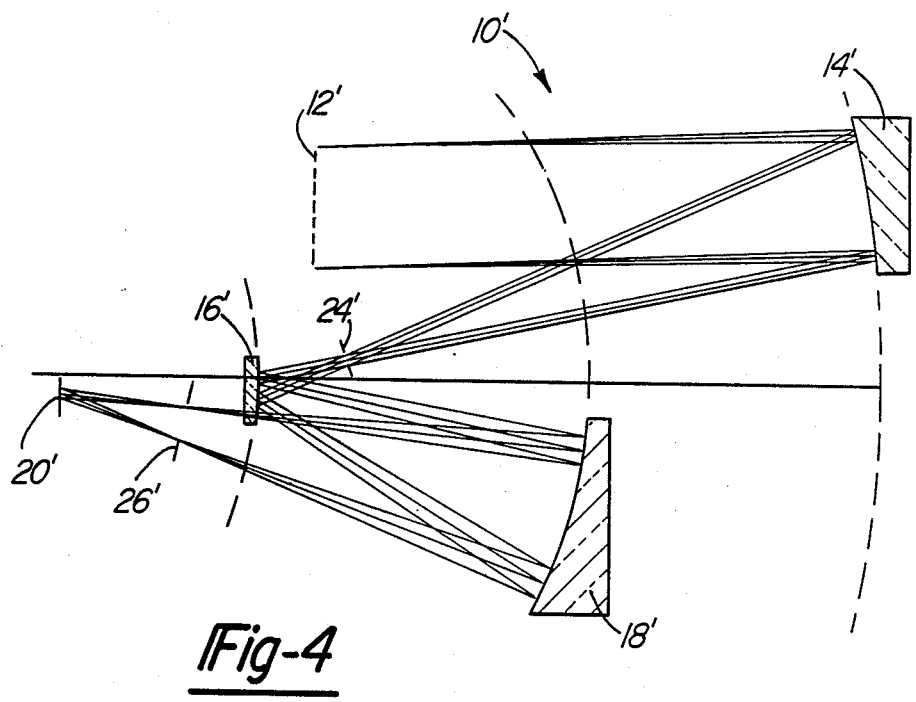
FIG. 4 is a diagrammatic side elevation of the optical system made in accordance with the teachings of the second embodiment of the present invention shown in FIG. 3.

In a second preferred embodiment as shown in FIGS. 3-4, the secondary mirror 14' and the tertiary mirror 16' are formed from spherical sections. Because spherical mirrors are easier to manufacture and test than mirrors formed from conic sections, the cost of the secondary mirror 14' and the tertiary mirror 16' is substantially less than that associated with mirrors formed from conic sections. A prescription for one non-limiting example of the second preferred embodiment of the present invention is given in the table below:

TABLE 2

| Surface | Radius | CC | Decenter | Tilt | Thickness |
|---|---|---|---|---|---|
| Entrance Pupil 12' | ∞ | — | 0.300 | — | 1.241 |
| Primary Mirror 14' | −2.276 | −0.8199 | — | — | −1.338 |
| Secondary Mirror 16' | −0.728 | — | — | — | 0.689 |
| Tertiary Mirror 18' | −0.943 | — | — | — | −1.114 |
| Focal Plane 20' | ∞ | — | — | 0.132 | — | where:
(+) Radii have centers to the right
(+) Thickness to the right
(+) Decenters are up
(+) Tilts are counterclockwise and in degrees
Decenters performed before tilts CC = $-\epsilon^2$ = −(Eccentricity)$^2$ In this example, the focal length was 1.00 and the entrance pupil diameter was 0.25. In addition, the field-of-view was 1°×10° with an offset of 2.0°, and an optical speed of F/4.0. The pupil magnification of this example was 0.27X.

In the third preferred embodiment of the present invention shown in FIGS. 5-6, the components of the apparatus 10" are similar to the components of the apparatus 10. However, the primary mirror 14", the secondary mirror 16″, and the tertiary mirror 18″ are generally aspheric. In one non-limiting example, the third preferred embodiment of the present invention, the apparatus 10″ has a focal length of 1.00, with an entrance pupil diameter of 0.38. In addition, the apparatus 10″ has a field-of-view of 1°×30° with zero offset, and had an optical speed of f/2.6. The pupil magnification of this example was 0.71X. The prescription for this particular example is given in the table below:

TABLE 3

| Surface | Radius | CC | D | E | Decenter | Tilt | Thickness |
|---|---|---|---|---|---|---|---|
| Entrance Pupil 12″ | ∞ | — | — | — | 0.458 | — | 1.510 |
| Primary Mirror 14″ | −2.176 | −0.6689 | $-0.103 \times 10^{-2}$ | $-0.369 \times 10^{-3}$ | — | — | −1.410 |
| Secondary Mirror 16″ | −1.321 | −2.0109 | 0.1157 | −0.2814 | 0.118 | 2.752 | 1.792 |
| Tertiary Mirror 18″ | −2.310 | $-0.748 \times 10^{-2}$ | $0.130 \times 10^{-3}$ | $0.284 \times 10^{-4}$ | 0.021 | −0.012 | −2.721 |
| Focal Plane 20″ | ∞ | — | — | — | — | — | — |

(+) Radii have centers to the right
(+) Thickness to the right
(+) Decenters are up
(+) Tilts are counterclockwise and in degrees
Decenters performed before tilts CC = $-\epsilon^2$ = −(Eccentricity)$^2$ The sag of each of the mirrors shown in the prescriptions given immediately above may be determined by the following equation where:

$$z = \frac{C\rho^2}{1 + \sqrt{1 - (\kappa + 1)C^2\rho^2}} + D\rho^4 + E\rho^6$$

where $z$ = sag
$C$ = 1/radius
$\rho^2$ = $x^2 + y^2$ where $x$ and $y$ are the $x$ and $y$ component of a given position on the mirror
$D,E$ = are given by the above table
$\kappa$ = $CC$ = conic constant From the foregoing prescription, it will be apparent that the apparatus 10 may have a useful field-of-view of between 1°×10° and 1°×30° when the aspect ratio is greater than 1/10. It will also be apparent that the primary, secondary and tertiary mirrors may be conic or aspheric in cross-section. Alternatively, the secondary and tertiary mirrors may be spherical in cross-section. Further, the intermediate image may be formed either on the optical axis (on axis as shown in FIG. 5) or displaced from the optical axis (off axis as shown in FIG. 1). In addition, the entrance pupil may be displaced from the optical axis so that it is unobstructed by other components of the apparatus.

It should be understood that the invention was described in connection with a particular example thereof. Other modifications will be apparent to those skilled in the art after a study of the specifications, drawings and following claims.

What is claimed is:

1. A three-mirror optical system for receiving optical signals comprising:
a primary mirror having an optical axis and a concave reflective surface yielding net positive optical power;
an entrance pupil displaced from said optical axis;
a secondary mirror optically communicating with said primary mirror, said primary mirror operable to create an intermediate image between said primary and said secondary mirror, said secondary mirror having a convex reflective surface yielding net negative optical power; and
a tertiary mirror optically communicating with said secondary mirror, said tertiary mirror having a concave reflective surface yielding net positive optical power.

2. The optical system of claim 1, further comprising a field stop disposed between said primary and said secondary mirror.

3. The optical system of claim 1, wherein said secondary mirror and said tertiary mirror have spherical sections.

4. The optical system of claim 1, wherein said primary, secondary and tertiary mirrors have conic cross-sections.

5. The optical system of claim 1, wherein said apparatus has a field-of-view between 1°×10° and 1°×30° and the aspect ratio of said apparatus is greater than 1/10.

6. The optical system of claim 1, wherein the pupil magnification of said apparatus is between 0.25X and 0.67X.

7. The optical system of claim 1, wherein the optical speed of said apparatus is slower than F/2.

8. The optical system of claim 1, wherein said apparatus further has an aperture stop and a final focal plane, said aperture stop disposed between said final focal plane and said tertiary mirror.

9. The optical system of claim 1, wherein said primary, secondary and tertiary mirrors have aspherical cross-section.

10. The optical system of claim 1, wherein said intermediate image is formed on said optical axis.

11. The optical system of claim 1, wherein said intermediate image is formed at a position which is displaced from said optical axis.

12. A method for receiving electromagnetic radiation from an entrance pupil and delivering said electromagnetic radiation to a final focal plane, said method comprising the steps of:
delivering said electromagnetic radiation from said entrance pupil to a primary mirror having an optical axis and a concave reflective surface yielding a net positive optical power, said entrance pupil being displaced from said optical axis;
delivering said electromagnetic radiation from said primary mirror to a secondary mirror to create an intermediate image therebetween, said secondary mirror having a convex reflective surface yielding net negative optical power;

delivering said electromagnetic radiation from a secondary mirror to a tertiary mirror, said tertiary mirror having a concave reflective surface yielding net positive optical power; and delivering said electromagnetic radiation from said tertiary mirror to said final focal plane.

13. The method of claim 12, wherein said step of delivering said electromagnetic radiation from said primary mirror to a secondary mirror comprises the step of delivering said electromagnetic radiation to a field stop.

14. The method of claim 12, wherein said secondary and tertiary mirrors have spherical cross-sections.

15. The method of claim 12, wherein said primary, secondary and tertiary mirrors have conic cross-sections.

16. The method of claim 12, wherein said primary, secondary, and tertiary mirrors have aspherical cross-sections.

17. The method of claim 12, wherein said step of delivering said electromagnetic radiation from said tertiary mirror to a final focal plane comprises the step of delivering said electromagnetic radiation to an aperture stop, said aperture stop disposed between said final focal plane and said tertiary mirror.

18. The method of claim 12, wherein said primary, secondary, and tertiary mirrors provide a field-of-view between 1°×10° and 1°×30° and the aspect ratio is greater than 1/10.

19. The method of claim 12, wherein primary, secondary, and tertiary mirrors provide a pupil magnification of between 0.25X and 0.67X.

20. The method of claim 12, wherein said primary, secondary and tertiary mirrors provide an optical speed slower than F/2.

21. The method of claim 12, wherein said intermediate image is formed on said optical axis.

22. The method of claim 12, wherein said intermediate image is formed at a position displaced from said optical axis.

* * * * *